Aug. 27, 1946. J. L. RYDE 2,406,404
INTERNAL-COMBUSTION ENGINE
Filed Oct. 12, 1945 3 Sheets-Sheet 1
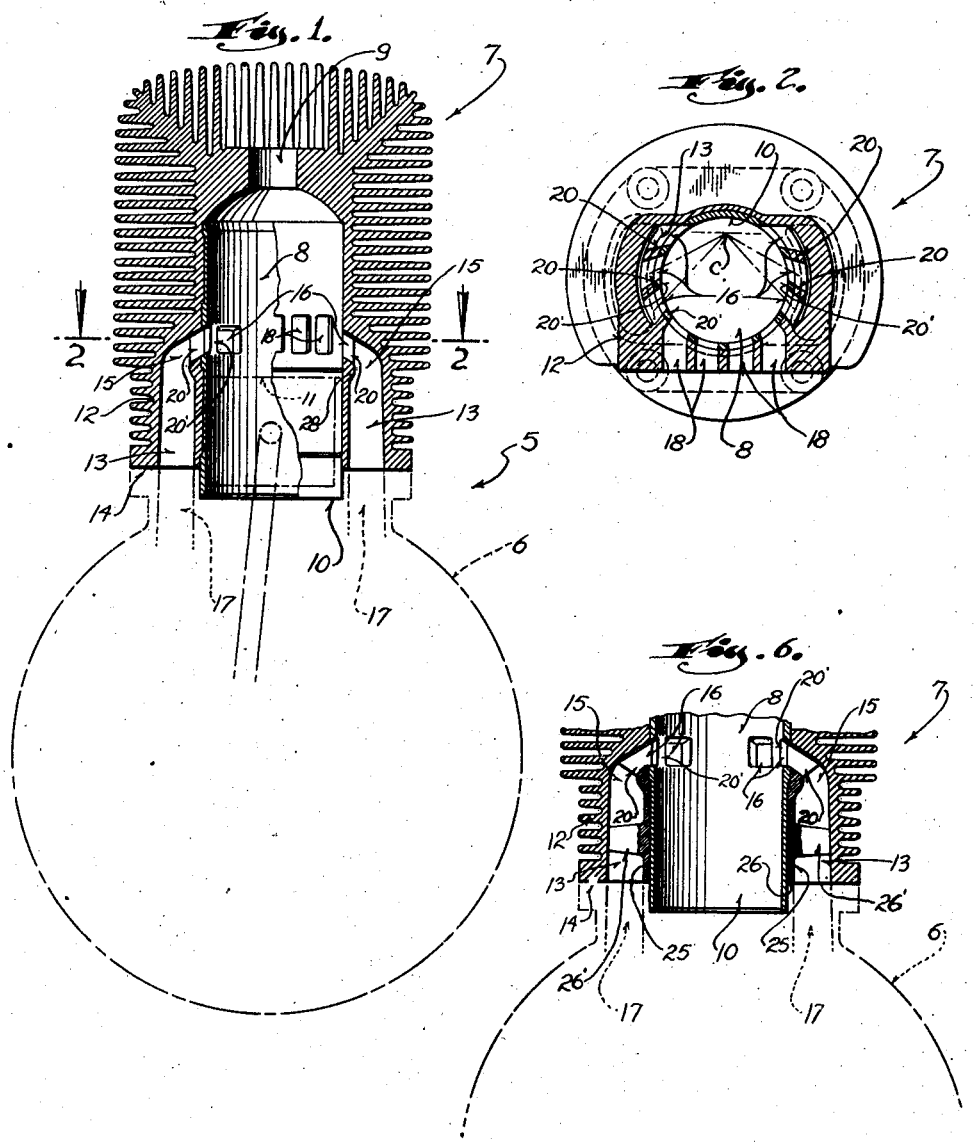

Inventor
John L. Ryde

Aug. 27, 1946.  J. L. RYDE  2,406,404
INTERNAL-COMBUSTION ENGINE
Filed Oct. 12, 1945  3 Sheets-Sheet 3
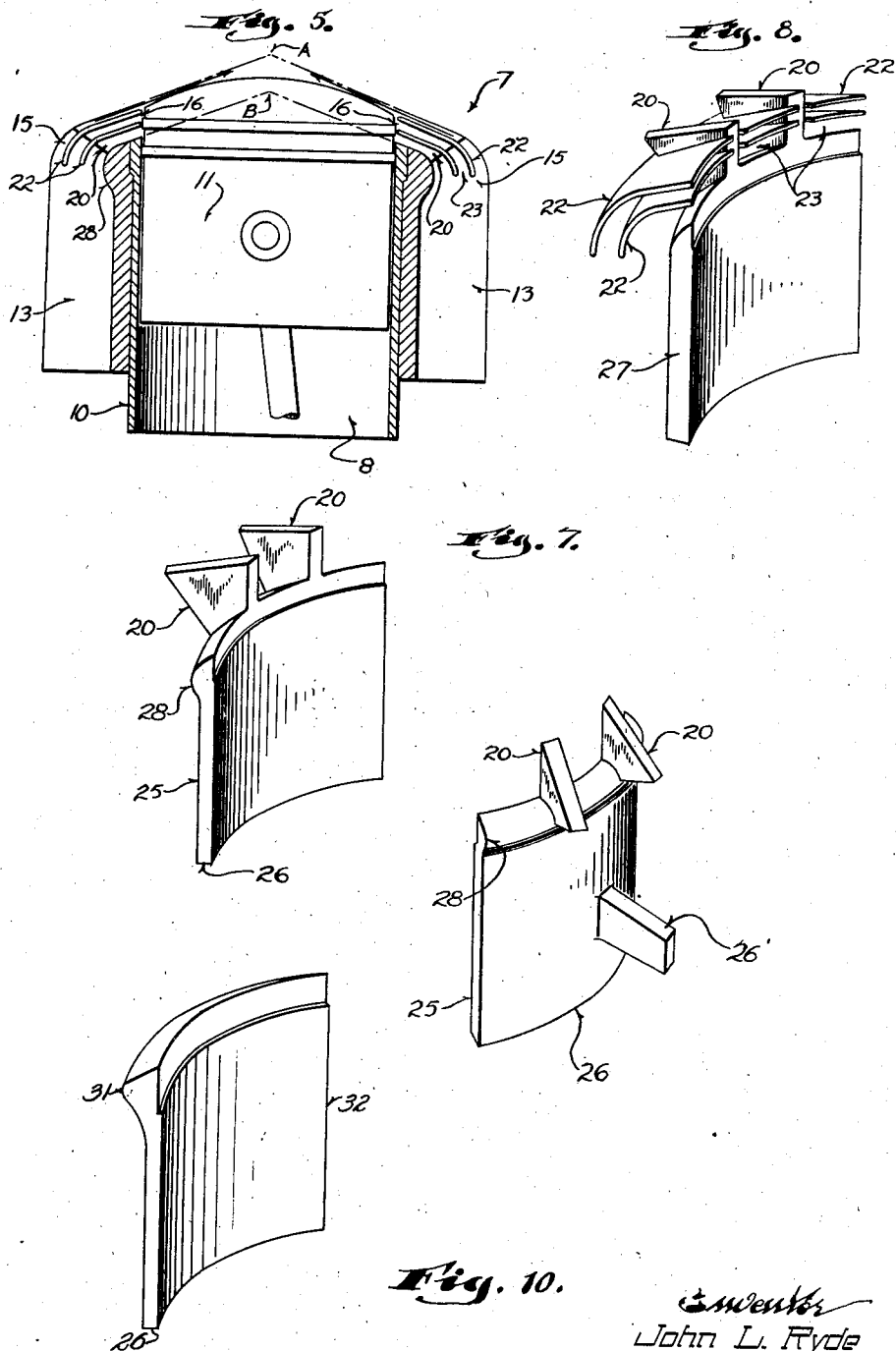

Patented Aug. 27, 1946

2,406,404

UNITED STATES PATENT OFFICE 2,406,404

INTERNAL-COMBUSTION ENGINE

John L. Ryde, Milwaukee, Wis., assignor to McCulloch Aviation, Inc., Los Angeles, Calif., a corporation of Wisconsin Application October 12, 1945, Serial No. 621,951

9 Claims. (Cl. 123—73)

This invention relates to internal combustion engines and has particular reference to cylinders for two cycle engines.

The scavenging or expulsion of the combustion gases from the cylinder bores has long been a problem in the design of two cycle gasoline and Diesel engines.

In general the combustion gases are expelled or scavenged from the cylinder bore through exhaust ports opening to the side of the bore and uncovered by the piston in its down stroke. The expulsion of the combustion gases is effected by a fluid scavenging medium admitted or injected into the cylinder through an intake port or ports opening to the side of the bore and uncovered by the piston in its downstroke.

In the two cycle Diesel engine, the scavenging medium is generally air alone, usually supplied to the cylinder bore, under pressure by means of a blower driven by the engine. In the two cycle gasoline engine, the scavenging medium is the air-fuel mixture which is caused to be forced into the cylinder bore by the down stroke of the piston.

Inasmuch as the principles of the present invention are applicable to both gasoline and Diesel engines, the following description and the claims employ the term "air" as a scavenging medium, with the understanding that "air" is intended to mean air alone in the case of the Diesel engine and air-fuel mixture in the case of the gasoline engine.

To facilitate scavenging, the pistons of two cycle engines have been commonly provided with a deflector on the top surface thereof arranged to pass adjacent to the inlet port or ports on the down stroke of the piston to cause the incoming "air" to be deflected upwardly toward the closed end of the cylinder bore and thereby force the burned gases downwardly and out through the exhaust port.

It is well known, however, that this method of directing the incoming "air" to effect scavenging produces admixture of the "air" with quantities of burned gases and results in considerable waste of the scavenging medium. This is particularly objectionable in the two cycle gasoline engine inasmuch as it causes waste of fuel and detracts from the combustion characteristics of the resulting combustible mixture; while in the Diesel engine the effectiveness of the combustible charge is also lessened and considerable scavenging air wasted.

The power developed by two cycle engines, therefore, depends to a large extent upon the amount of burned gases remaining in the cylinder bore and detracting from the effectiveness of the combustible charge left in the bore; while efficiency depends to a large extent upon the amount of scavenging medium employed or wasted in scavenging.

While the conventional method of deflecting the incoming "air" upwardly into the cylinder bore by a deflector on the top of the piston provides a measure of control over the exhaust gases, the results are far from satisfactory. Thus in an effort to improve the scavenging, attempts have been made in the past to control the injection of the incoming "air" through the medium of elongated intake passages drilled straight through the walls of the cylinder. While this was a step in the right direction this and other past attempts to better the scavenging entailed such cumbersome constructions that engines embodying these directional intake ports were impractical and commercially unsatisfactory.

It is, therefore, a general object of this invention to provide a two cycle engine of the character described with a cylinder having "air" inlet and exhaust gas ports of improved design and construction to thereby improve the power and efficiency of the engine by effecting scavenging without any appreciable waste of scavenging medium or admixture thereof with the combustion gases and to achieve this desideratum without entailing cumbersome or otherwise undesirable structural design.

Another object of this invention resides in the provision of a cylinder for a two cycle engine having its inlet passages built into the walls of the cylinder with the mouths thereof opening to the cylinder bore at substantially diametrically opposite points at both sides of the exhaust port and provided with means therein for directing the incoming "air" slightly upwardly at predetermined angles and laterally away from the axis of the bore so that the streams of "air" entering from opposite sides of the bore converge toward a point of confluence near the wall of the bore opposite the exhaust port and at the side of the inlet ports adjacent to the closed end of the bore.

This arrangement and manner of injecting "air" into the cylinder bore has as its purpose to effect a substantially well defined columnar ascent of the "air" upwardly along the wall of the bore opposite the exhaust ports to force burned gases out through the exhaust ports at the side of the cylinder bore opposite the rising column of "air" with little or no admixture of the "air" with the combustion gases being scavenged.

I have found that the upward angle at which the streams of "air" enter the bore must be maintained within well defined limits in order to effect proper scavenging and avoid mixing of the "air" with the combustion gases. In many instances, however, the piston in its downward stroke to uncover the inlet ports and admit "air" to the bore causes the streams of "air" to be deflected substantially directly toward the closed end of the bore (nearly longitudinally of the bore) especially during initial uncovering of the inlet ports by the top of the piston. This is especially true of engines running at slow speeds.

Hence, it is another object of this invention to provide a cylinder for two cycle engines with inlet ports of the character described by which "air" injection into the cylinder bore at substantially predetermined angles to a radial plane of the bore is assured regardless of the position of the top of the piston with respect to the inlet ports.

Still another object of this invention is to provide a practical and expedient manner of compactly constructing and building the intake ports into the cylinder wall without detracting from the desirable directional aspect of the porting, but, which permits the inlet passages to be formed by the simple expedient of coring longitudinal chambers in opposite sides of the cylinder wall at the time of casting with the chambers opening to the bottom of the cylinder casting per se.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which:

Figure 1 is a longitudinal sectional view through a cylinder for a two cycle engine with portions thereof in elevation showing the cylinder constructed in accordance with the principles of this invention;

Figure 2 is a cross sectional view taken through Figure 1 on the plane of the line 2—2;

Figure 5 is a diagrammatic view similar to Figure 4 illustrating how the angle of "air" injection is preserved by this invention regardless of the position of the piston top with respect to the inlet ports;

Figure 6 is a fragmentary longitudinal sectional view illustrating another modification of this invention wherein deflection of the "air" entering the cylinder bore at the proper angles is accomplished by inserts in the inlet passages of the cylinder;

Figure 7 is a perspective view of the inserts by which proper deflection of the "air" entering the cylinder bore is obtained;

Figures 8 and 10 are perspective views of modified types of inserts for the "air" inlet passages of the cylinder.

Figure 3:
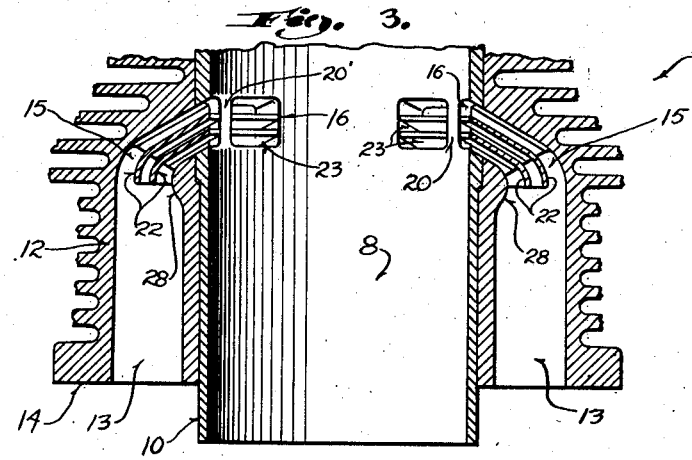
Figure 3 is a fragmentary longitudinal sectional view of a slightly modified cylinder provided with means for assuring the proper angular injection of scavenging medium into the cylinder bore.

Referring now more particularly to the accompanying drawings, the numeral 5 designates generally an internal combustion engine of the two cycle type. For the sake of simplicity, the present invention will be considered as applied to a single cylinder two cycle gasoline engine although the invention is applicable to multi-cylinder and Diesel engines as well.

The engine comprises a crankcase 6, indicated in construction lines in Figure 1, having the cylinder of this invention mounted at its top in the usual manner.

The cylinder 7 of this invention is preferably a die casting and is provided with a bore 8 opening to the bottom of the cylinder so as to communicate with the interior of the crankcase. The upper end of the bore 8 is closed except for the usual spark plug opening 9, and in the present instance the bore is defined by a substantially tubular liner 10 cast into the cylinder and within which the piston 11 (indicated in construction lines in Figure 1) is reciprocably received.

The side wall 12 of the cylinder is cored as at 13 at diametrically opposite sides of the bore to form longitudinal "air" inlet passages leading from the bottom face 14 of the cylinder upwardly toward the medial portion of the cylinder bore from whence the passages branch inwardly toward each other as at 15 and open into the bore through the liner 10 to provide opposite inlet ports 16 by which the "air" is admitted to the bore from the interior of the crankcase in the usual manner upon the down stroke of the piston. For this reason the lower ends of the passageways 13 communicate with crankcase passageways indicated at 17 leading to the interior of the crankcase.

In the case of the Diesel engine, the passageways 13 would connect with the outlet of a blower (as of the Roots type) to enable plain air to be supplied to the bore under pressure for scavenging and admixture with fuel injected separately into the bore.

The burned gases are exhausted from the bore through a series of circumferentially arranged radially disposed exhaust ports 18 opening to the bore through the liner 10 at one side of the bore between the inlet ports 16. The bottom edges of these ports 18 are substantially in line with the bottom edges of the inlet ports 16 but the top edges of the exhaust ports extend upwardly to a higher elevation than those of the inlet ports so as to relieve combustion gas pressure during the down stroke of the piston just prior to uncovering of the inlet ports by the top of the piston.

As previously stated it is one of the objects of this invention to improve the scavenging of exhaust gases from the cylinder bore by control of "air" injection into the bore. In the present instance this is accomplished without resorting to the use of deflector means on the piston itself. The "air" which is admitted into the bore 8 through the opposite inlet ports 16 is caused to travel at predetermined slightly upward angles with respect to a radial plane of the bore by its passage through the branches 15 of the "air" supply ducts.

Figure 4:
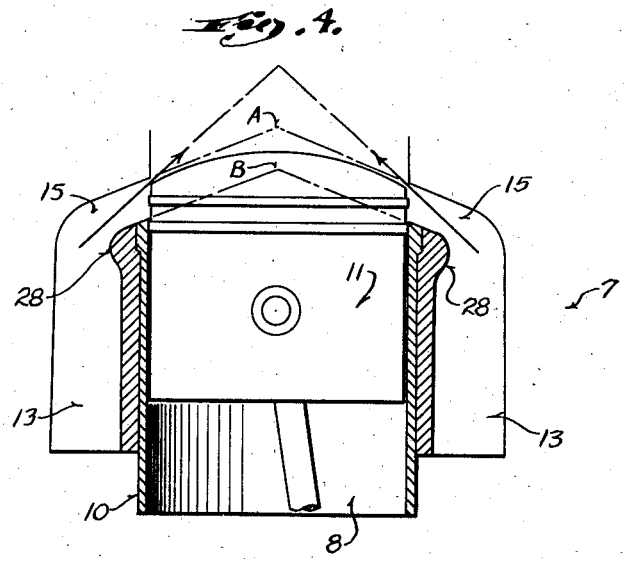
Figure 4 is essentially a diagrammatic sectional view similar to Figure 3 illustrating the effect of the piston on the direction of "air" injection into the cylinder bore at the time of initial uncovering of the inlet ports by the top of the piston.

Referring particularly to Figures 4 and 5, it will be noted that the branches 15 of the cylinder "air" passageways extend inwardly toward each other but point slightly toward the closed end of the bore so as to direct the streams of "air" issuing therefrom at predetermined angles to a radial plane of the bore and toward a point of junction midway between the inlet ports.

The inclination of the incoming streams of "air" may be predetermined from about ten to thirty degrees with respect to said radial plane of the bore, but experience has shown that "air" injection at an angle of approximately twenty degrees to the radial plane of the bore is highly satisfactory especially in small engines. Some variation of the angle of "air" injection may, of course, be advantageous with engines having larger cylinder bores.

In the diagrams of Figures 4 and 5 it will, therefore, be seen that the streams of "air" travel inwardly and tend to converge midway between the inlet ports between points A and B. The streams of "air" are not permitted to converge on the axis of the bore but are deflected laterally away from the axis toward the side of the bore opposite the exhaust ports to converge at a common point of confluence designated C in Figure 2 located between the axis of the bore and said side wall thereof opposite the exhaust ports with the point C preferably close to said side wall of the bore.

This lateral deflection of the incoming streams of "air" is effected by means of upright vanes 20 in the branches 15 of the "air" passageways and which divide the mouth of each branch into a plurality of circumferentially adjacent inlet ports 16. The positioning of the vanes to bring about the desired result, which is the confluence of the streams of "air" entering the bore from opposite sides thereof at or adjacent to the point C, is clearly shown in Figure 2.

The vanes 20 may form an integral part of the cylinder casting and it will be noted that the opposite sides of the liner 10 are cut out to provide openings in line with the ports separated by ribs 20' aligning with and substantially forming extensions of the vanes 20.

As stated, the inclination of the branches 15 of the "air" passageways and the lateral deflection accomplished by the vanes 20 produces a resultant angle of "air" injection leading slightly upwardly into the bore and toward the side of the bore opposite the exhaust ports with the point of confluence of the opposite streams lying between the axis of the bore and said side wall of the bore opposite the ports 18.

This manner of controlling "air" injection has been found desirable by reason of the fact that the "air" is caused to rise upwardly from the point C along the wall of the bore opposite the exhaust ports substantially in a column filling the longitudinal half of the bore opposite the exhaust ports and toward the closed end of the bore upon the down stroke of the piston. This directional flow of the "air" very effectively causes the combustion gases in the bore to be forced downwardly from the upper limits of the bore and out through the exhaust ports 18 with little or no admixture of the "air" with the burned gases and thus improves the combustion characteristics of the charge and increases efficiency of the engine.

Further assurance against entrance of the streams of "air" into the cylinder bore at other than the desired predetermined upward inclination may be had through the provision of splitters 22 in the branches 15 of the "air" passageways extending across the inlet ports 16 between the vanes 20.

These splitters are thin curved fin-like elements substantially concentric to the top and bottom walls of the branches and divide each inlet port 16 into a plurality of longitudinally adjacent discharge openings 23. It is the purpose of the splitter elements 22 to prevent sharp upward deflection of "air" entering the bore at the time of initial uncovering of the intake ports by the piston as illustrated in Figure 4, and to effect a smooth transfer of "air" into the branches 15 by their curved outer ends which extend down into the longitudinal portions 13 of the "air" passageways.

From Figure 4 it will be seen that at the instant at which a substantially small portion of the intake ports is uncovered by the piston, the top of the piston itself causes the incoming "air" to be deflected sharply upwardly out of the predetermined angle desired, more directly toward the closed end of the bore.

The action of the fin-like splitters 22 may be observed by reference to the diagram of Figure 5 wherein it will be clear that the stratification of the incoming "air" into separate longitudinal streams each produced upon travel of the top of the piston past the splitters effects injection of the "air" at the desired angle and causes convergence of the "air" streams within the area situated between the points A and B.

If desired, the vanes 20 may be formed integrally with cast inserts 25 shaped to hug the inner wall of the "air" passageways 13 and held in place by having their lower ends 26 abut against the top face of the crankcase as will be apparent from Figure 6, and by having ears 26' extending radially outwardly from their lower ends to engage the far walls of the passageways 13.

The provision of inserts having vanes separate from the cylinder simplifies the cylinder casting and allows substantially unobstructed "air" inlet passageways 13 and branches 15 to be cored therein. The vanes 20 on the inserts are likewise located at angles such as illustrated in Figure 2 to effect deflection of the "air" streams laterally away from the bore axis toward the wall of the bore opposite the exhaust ports.

It is also to be observed that the vanes of the inserts may be provided with splitters 22 integral therewith and extending between the vanes to effect the purpose hereinbefore described. Such an insert is shown at 27 in Figure 8.

In most instances either the inner wall of the "air" passageways 13 or the exterior wall of the inserts have been shown provided with a circumferential rib-like bead 28 projecting outwardly into the "air" passageways 13 adjacent to their junctures with the branches 15. These beads 28 cause the "air" flowing toward the branches 15 to be deflected outwardly with relation to the cylinder bore and into the extreme outer ends of the branches 15 to assure travel of the "air" throughout the entire length of the branches and thus achieve a "piping in" of the "air" through the branches.

Figure 9:
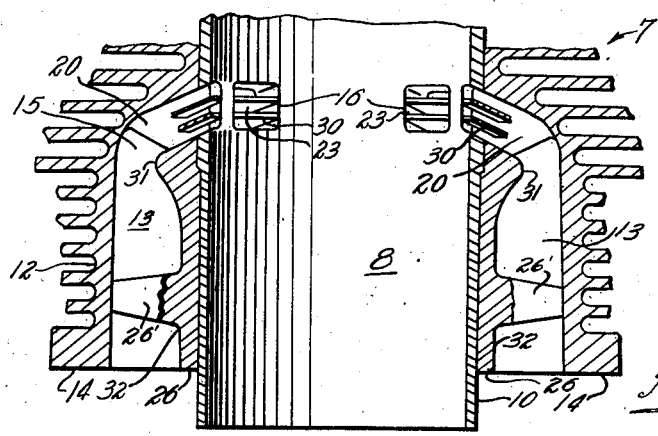
Figure 9 is a sectional view similar to Figure 3 illustrating another manner of assuring proper angular control over "air" admission to the cylinder bore.

While the beads 28 are not essential when the splitters 22 have their outer ends curved downwardly and extending into the passageways 13 as is shown in Figure 8, they are particularly valuable in the event the splitters are formed by relatively short straight fin-like elements 30 such as shown in Figure 9. The splitters 30 do not have their outer ends curved downwardly to project into the upper end of the longitudinal portions of the "air" passageways 13 and hence cannot alone serve to smoothly transfer the "air" flowing upwardly through the passages 13 into the branches 15.

In this event, it is preferable to employ enlarged beads 31 either on inserts 32 for the "air" passageways or on the inner walls of the passageways themselves. The vanes 20 and splitters 30 of Figure 9 are shown cast integrally with the cylinder with the bead 31 on an insert 32 such as illustrated in Figure 10, but it will be obvious that the insert 32 may have the vanes and splitters formed integrally thereon as in the Figure 8 embodiment.

The bead 31, when properly designed, has the effect of elongating the branches 15 even though the same may be held to a minimum length for compactness of the cylinder as previously pointed out. The function of the splitters 30 in this instance, therefore, is to divide the inlet ports into a plurality of separate longitudinally adjacent discharge nozzles to preserve the predetermined upward angle of "air" injection into the cylinder bore. The spacing between the splitters and the top and bottom walls of the branches 15 is preferably relatively small as compared to the length of the splitters to achieve this purpose.

Attention is directed to the fact that when the splitters have their outer extremities extended and curved downwardly into the longitudinal portions 13 of the "air" passageways as shown in Figures 3 and 8, the circumferential bead 28 on the inner wall of the "air" passageway is unnecessary, provided the splitters effect a substantially equal division of the space in said passageways.

By way of illustration, the insert 27 of Figure 8 has been shown without the annular bead and with the curved outer ends of the splitters arranged to effect the desired smooth transfer of "air" from the passageways 13 into their branches 15. Hence, a straight walled insert (without the circumferential bead) would, therefore, suffice in the "air" passages 13 in the event the vanes 20 and splitters 22 of the Figure 3 embodiment were cast integrally with the cylinder.

From the foregoing description taken in connection with the accompanying drawings, it will be readily apparent that this invention improves the scavenging of combustion gases from the cylinders of two cycle internal combustion engines by reason of the angular control over the streams of "air" entering the bore, and consequently results in greater efficiency and less waste of the scavenging medium.

To avoid misunderstanding, it is again desired to point out that the term "air" is intended to cover air injection as practiced in Diesel engines and air-fuel admission as employed in gasoline engines, and that "air" is meant to be synonomous with "scavenging medium." Both in the preceding description and in the following claims, therefore, the term "air" is intended to be interpreted as the scavenging medium; air alone for Diesel engines and air-fuel mixture for gasoline engines.

What I claim as my invention is:

1. In a two cycle internal combustion engine: a cast cylinder provided with a bore opening through the bottom of the cylinder to slidably receive a piston therein, said cylinder having cored passageways therein leading to "air" inlet ports in the wall of the bore at apposite sides thereof medially of the ends of the bore and through which "air" may be supplied to the bore whenever the piston moves past and uncovers the ports in its travel toward the open end of the bore, said passageways, at least adjacent to the inlet ports, being disposed at a slight angle to a radial plane of the bore to cause "air" entering the bore to discharge in streams pointing slightly toward the closed end of the bore; and inserts confined in said passageways to lie along the sides thereof and each having a plurality of vanes disposed in the passageway adjacent to the ports for causing the streams of "air" to discharge into the bore laterally away from the bore axis to converge toward a common point of confluence with said point of confluence lying midway between the opposite ports near one side wall of the bore and at the side of the ports remote from the open end of the bore.

2. In a two cycle internal combustion engine: a cast cylinder having a bore opening through the bottom of the cylinder to slidably receive a piston therein, said cylinder having cored passageways therein leading to "air" inlet ports in the wall of the bore at opposite sides thereof medially of the ends of the bore and through which "air" may be supplied to the bore whenever the piston moves past and uncovers the ports in its travel toward the open end of the bore, the inner portions of each passageway adjacent to the bore being disposed at an angle of approximately 20° to a radial plane of the bore to cause "air" entering the bore to discharge in streams pointing slightly toward the closed end of the bore and converging toward a point midway between the ports; individual inserts, one confined in each of said passageways and each having a plurality of vanes disposed in the passageways adjacent to the discharge ports for causing the streams of "air" entering the bore at said predetermined inclination toward the closed end of the bore to be directed laterally away from the bore axis to converge toward a common point of confluence with said point of confluence lying midway between the ports near one side wall of the bore and at said side of the ports remote from the open end of the bore; and splitter vanes carried by said inserts and extending crosswise of the ports to divide the same into a plurality of longitudinally adjacent discharge nozzles adapted to be successively uncovered by the piston as it travels past the ports toward the open end of the bore, said splitter vanes serving to maintain the predetermined angular inclination of the "air" entering the bore despite partial closure of the ports by the piston.

3. In a two cycle internal combustion engine: a cast cylinder having a bore opening to one end thereof and having substantially diametrically opposite longitudinal "air" inlet passages formed in its side wall communicated with the cylinder bore through branch passages angling abruptly from the longitudinal passages inwardly toward the bore with the mouths of said branches opening to the bore substantially medially of its ends and at substantially diametrically opposite sides thereof, said branches extending toward each other at relatively small identical angles to a radial plane of the bore so as to direct "air" into the bore at slight inclinations toward the closed end of the bore; means in said branch passages for deflecting "air" flowing therethrough into the bore at said slight inclination laterally to one side of the bore axis toward a point of convergence located midway between the mouths of the branches but close to one side wall of the bore; and splitter vanes in each branch passage dividing the same into a plurality of longitudinally adjacent discharge passageways, said splitter vanes having curved outer end portions the extremities of which extend into the longitudinal passages to assure smooth transfer of "air" from said longitudinal passages into the branch passages and to divide the "air" flowing through the longitudinal passages into a plurality of separate streams at the outer entrances to said branch passages.

4. In a two cycle internal combustion engine: a cast cylinder provided with a bore opening to the bottom of the cylinder but closed at the top thereof, said bore being adapted to slidably receive a piston; means defining diametrically opposite substantially parallel "air" passages in the wall of the cylinder with said passages extending longitudinally of the bore axis and close to the bore so as to enable the dimensions of the cylinder at its bottom portion to be held to a minimum, said "air" passages opening to the bottom of the cylinder and having their portions remote from the bottom of the cylinder branching angularly inwardly toward each other and opening to the cylinder bore substantially medially of its ends at substantially diametrically opposite sides of the bore, said inwardly directed branch passages being disposed at an angle of approximately 20° to a radial plane of the bore so as to direct "air" flowing therethrough slightly upwardly into the bore toward the closed end thereof and toward a point of convergence located midway between the mouths of the branch passages; an insert confined in each of said "air" passages, said inserts being separate from the cylinder casting and each having a substantially circumferential bead projecting into its longitudinal "air" passage for deflecting "air" flowing through the longitudinal passages outwardly into the outermost portions of the branch passages to thereby assure directional control of the "air" by said upwardly inclining branch passages; longitudinal vanes in said branch passages for effecting lateral deflection of "air" flowing therethrough to one side of the bore axis and convergence of the streams of "air" entering the bore at said slight upward inclination toward a point of confluence midway between the mouths of the branch passages but located to one side of the bore axis and near the cylinder wall defining the bore whereby said streams of "air" join and ascend along said side of the bore in columnar fashion toward the closed end of the bore; and means providing an exhaust port opening to the bore opposite from said point of confluence of the streams of "air" flowing into the bore.

5. In a two cycle internal combustion engine: a cast cylinder provided with a bore opening to one end of the cylinder to slidably receive a piston, said cylinder having diametrically opposite cored passages in its side wall extending longitudinally of the cylinder and communicated with the cylinder bore through branch passages angling abruptly therefrom with the mouths of said branch passages opening to the cylinder bore substantially medially of its ends from opposite sides of the bore whereby "air" is supplied to the bore whenever the piston moves past the mouths of the branch passages toward the open end of the bore; an individual insert in each of said cored passages, each insert having a circumferential bead positioned along the inner wall of its longitudinal passage and projecting thereinto adjacent to the outer extremity of the branch passage thereof for deflecting "air" approaching the branch passages outwardly into the outermost portions of the branch passages so as to insure smooth transfer of "air" from the longitudinal passages to the branch passages and to thereby assure angular directional control of the "air" by said branch passages; and deflector vanes cast integrally with the cylinder and disposed in said branch passages for directing the streams of "air" entering the bore laterally away from the bore axis toward a point of confluence located midway between the ports and close to one side wall of the bore.

6. In a two cycle internal combustion engine: a cast cylinder provided with a bore opening to one end of the cylinder to slidably receive a piston, said cylinder having diametrically opposite cored passages in its side wall extending longitudinally of the cylinder and communicated with the cylinder bore through branch passages angling abruptly inwardly therefrom at relatively slight predetermined angles to a radial plane of the bore and toward the closed end of the bore, the mouths of said branch passages opening to the bore substantially medially of its ends from opposite sides of the bore; deflector vanes cast integrally with the cylinder and disposed in said branch passages for dividing the "air" entering the bore at said predetermined inclination into streams directed laterally away from the bore axis toward a point of confluence located midway between the ports and close to one side wall of the bore; and an individual insert in each of said cored passages, each of said inserts having a circumferential bead positioned along the inner wall of its longitudinal passage and projecting thereinto adjacent to the outer extremity of the branch passage leading therefrom for deflecting "air" approaching the branch passages outwardly into the outermost portions thereof so as to insure smooth transfer of "air" from the longitudinal passages to the branch passages and to thereby assure proper directional control of the "air" by said inclined branch passages.

7. In a two cycle internal combustion engine: a cast cylinder having a bore opening to one end to slidably receive a piston and having substantially diametrically opposite longitudinal "air" inlet passages cored in its side wall and communicated with the cylinder bore through branch passages angling abruptly from said longitudinal passages with the mouths of said branch passages opening to the bore substantially medially of its ends and from opposite sides of the bore; and an individual insert in each of said "air" passages, each of said inserts having deflector means thereon to act on "air" flowing through the passages to aid in controlling the direction at which the "air" enters the bore.

8. In a two cycle internal combustion engine: a cast cylinder having a bore opening to one end to slidably receive a piston and having substantially diametrically opposite longitudinal "air" inlet passages cored in its side wall and communicated with the cylinder bore through branch passages angling abruptly from said longitudinal passages with the mouths of said branch passages opening to the bore substantially medially of its ends and from opposite sides of the bore; and individual inserts in said cored passages each having substantially longitudinal vanes thereon projecting into the branch passages and positioned at angles such as to deflect "air" flowing through the branch passages laterally toward a common point of convergence located at one side of the cylinder axis, and spaced substantially circumferentially extending splitter vanes carried by said inserts and extending across the branch passages to divide the same into a plurality of longitudinally adjacent substantially shallow (axially) discharge ports, said splitter vanes lying at an angle of approximately 20° with respect to a radial plane of the bore with their inner ends inclined toward the closed end of the bore and their outer ends curved downwardly from the branch passages and extending into the upper portions of the longitudinal passages so as to facilitate transfer of "air" from the longitudinal passages to the abruptly angling branch passages.

9. A cylinder construction for port-scavenged internal combustion engines comprising: a cast cylinder provided with a bore and having a cored "air" inlet passageway in its side wall leading to the bore, said inlet passageway comprising two branches disposed at a substantially abrupt angle to each other with one of said branches extending substantially longitudinally of the bore and the other substantially transverse thereto and opening to the bore, the substantially abrupt turn at the juncture of said branches subjecting the flow of "air" to the bore through said passageway to a substantially abrupt change in direction, said transverse branch being relatively short so that of itself it is incapable of guiding "air" delivered thereto from the substantially longitudinal branch into the cylinder at a definite angle; an insert separate from the cylinder casting and confined in said inlet passageway; and means carried by said insert and lying in the path of "air" flowing through the passageway for effecting smooth transfer of the "air" around the turn in the passageway at the juncture of its branches to enable the transverse branch to exert directional guidance on the "air" flowing therethrough.

JOHN L. RYDE.